May 22, 1945.   D. B. SINCLAIR   2,376,394
NULL-TYPE METER AND METHOD
Filed April 7, 1941   4 Sheets-Sheet 1

Inventor
Donald Bellamy Sinclair
by David Rines
Attorney

May 22, 1945. D. B. SINCLAIR 2,376,394
NULL-TYPE METER AND METHOD
Filed April 7, 1941 4 Sheets-Sheet 2

Inventor
Donald Bellamy Sinclair
by David Rines
Attorney

May 22, 1945.   D. B. SINCLAIR   2,376,394
NULL-TYPE METER AND METHOD
Filed April 7, 1941   4 Sheets-Sheet 3

Inventor
Donald Bellamy Sinclair
by [signature]
Attorney

May 22, 1945.  D. B. SINCLAIR  2,376,394
NULL-TYPE METER AND METHOD
Filed April 7, 1941  4 Sheets-Sheet 4

Fig.10

Inventor
Donald Bellamy Sinclair
by
Attorney

Patented May 22, 1945

2,376,394

UNITED STATES PATENT OFFICE 2,376,394

NULL-TYPE METER AND METHOD

Donald Bellamy Sinclair, Concord, Mass., assignor to General Radio Company, Cambridge, Mass., a corporation of Massachusetts Application April 7, 1941, Serial No. 387,239

32 Claims. (Cl. 175—183)

The present invention relates to the art of electric measurements, and more particularly to alternating-current measurements. From a more specific aspect, the invention relates to apparatus and methods for the radio-frequency measurements of impedances, including resistances and reactances. From a still more specific aspect, the invention relates to alternating-current measuring methods and apparatus employing Wheatstone bridges wherein a null indication is obtained by adjustment of certain of the elements of the bridge.

An object of the invention is to provide a new and improved meter of the above-described character.

A further object is to provide a new and improved null method of measuring impedances, particularly relatively low impedances, or impedances having relatively low resistive components, such as are encountered in low-resistance units, antennas and transmission lines.

A further object is to provide a novel meter that shall measure both resistive and reactive components of the impedance in terms of incremental values of variable reactors.

Another object is to provide a high-frequency meter of the above described character that shall not contain variable resistors as necessary circuit elements.

Still another object is to provide a high-frequency meter of the above-described character having only inductive or capacitive reactances.

Another object is to provide a novel meter of the above-described character that shall be simple of construction and easy of manipulation.

Other and further objects will be explained hereinafter and will be particularly pointed out in the appended claims.

The invention will now be explained more fully in connection with the accompanying drawings, in which.

Figures 1, 2, 3:
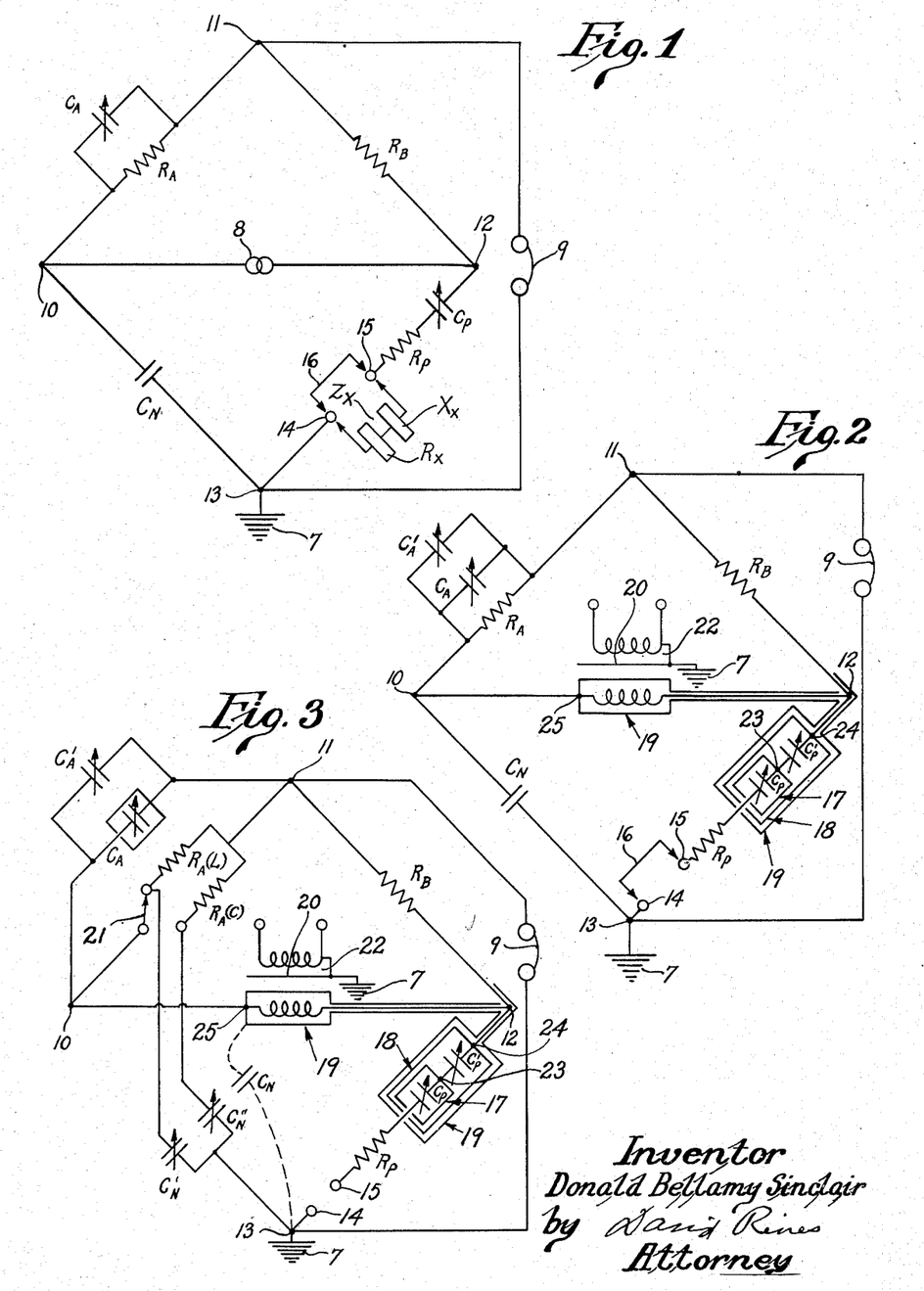
Fig. 1 is a diagrammatic simplified view of a Wheatstone-bridge circuit arranged and constructed to illustrate fundamental principles underlying the present invention.
Fig. 2 is a similar view of a modification.
Fig. 3 is a similar view illustrating a preferred embodiment of the invention.

The principles underlying the present invention may be understood from Fig. 1, illustrating a non-inductive Wheatstone bridge provided with a non-resistive first arm having a substantially pure fixed capacitor $C_N$, a non-reactive second arm opposite thereto having a substantially pure fixed resistor $R_B$, a third arm having a fixed resistor $R_A$ and a variable capacitor $C_A$, in parallel, and a fourth arm having a fixed resistor $R_P$, a variable capacitor $C_P$, and terminals 14 and 15, in series. The first and the second arms of the bridge may be referred to as one of the two pair of oppositely disposed arms of the bridge, and the third and fourth arms as the other pair of oppositely disposed arms.

Figures 4, 5, 6:
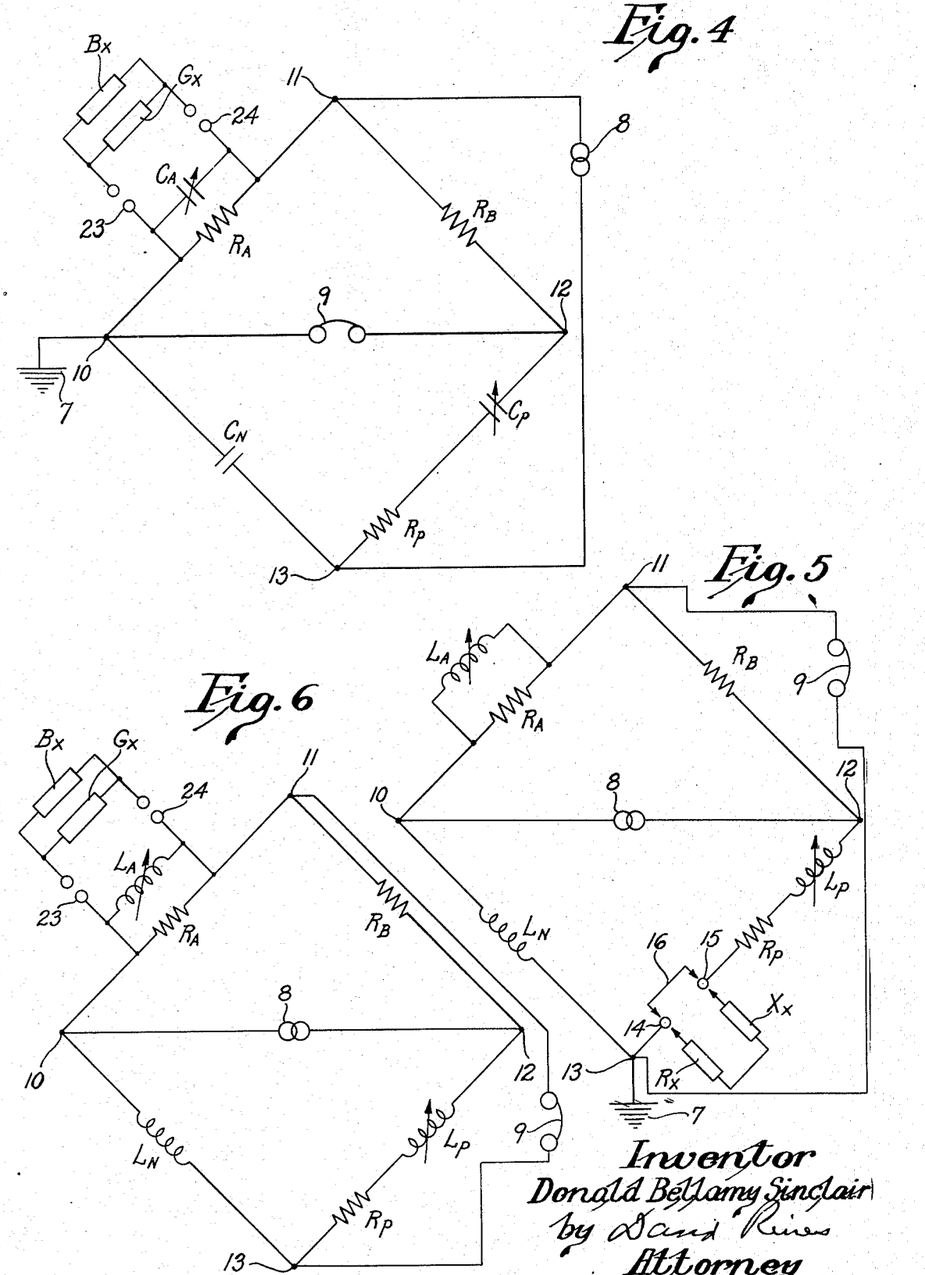
Fig. 4 is a view similar to Fig. 1 of a modification according to which the unknown impedance may be connected into a different arm of the bridge.
Fig. 5 is a view similar to Fig. 1 of a modification according to which the capacitors are replaced by inductors.
Fig. 6 is a modification differing from Fig. 5 in the same way that Fig. 4 differs from Fig. 1.

A generator or other source 8 of high-frequency alternating-current energy may be connected to opposite vertices 10 and 12 of the bridge and a detector 9 may be connected to the other two vertices 11 and 13. As in any bridge, the detector 9 and the generator 8 may be interchanged; that is, as shown in Fig. 4, the detector 9 may be connected to the vertices 10 and 12, and the generator to the vertices 11 and 13. Any of the bridge vertices 10, 11, 12 and 13 may be grounded, as shown at 7. In the system of Fig. 1, it is preferred to ground the vertex 13; in that of Fig. 4, the vertex 10. The generator source 8 may be constituted of a transformer 22, as shown in Figs. 2 and 3, having a primary winding grounded at 7, and shielded at 20.

The invention is illustrated in Fig. 1 as adapted for series-substitution measurements. The unknown impedance $Z_x$, shown diagrammatically as disconnected in Fig. 1, is assumed to have a series reactive component $X_x$ and a series resistive component $R_x$. The relation between these, of course, is $$Z_x = R_x + jX_x$$

where $j$ is the imaginary, $\sqrt{-1}$.

A preliminary balance is first made, the terminals 14 and 15, in series with the resistor $R_P$ and capacitor $C_P$, being short-circuited, with the aid of a short-circuiting element 16, by adjusting the variable capacitors $C_A$ and $C_P$. Let the capacitance values of the capacitors $C_A$ and $C_P$ required for balance be represented by $C_{A_1}$ and $C_{P_1}$, respectively.

The short-circuiting element 16 is then removed, the unknown impedance $Z_x$ is connected to the terminals 14 and 15, and the bridge is re-balanced by readjustment of the condensers $C_A$ and $C_P$. Let the capacitance values of the capacitors $C_A$ and $C_P$ required to produce this new balance be represented by $C_{A_2}$ and $C_{P_2}$, respectively.

As explained in my paper, entitled, "A radio-frequency bridge for impedance measurements from 400 kilocycles to 60 megacycles," Proceedings of the Institute of Radio Engineers, November, 1940, page 497, the unknown resistance $R_x$ and the unknown reactance $X_x$ may then be determined by the following relations:

$$R_x = \frac{R_B}{C_N}(C_{A_2} - C_{A_1}) \qquad (1)$$

$$X_x = \frac{1}{\omega}\left(\frac{1}{C_{P_2}} - \frac{1}{C_{P_1}}\right) \qquad (2)$$

where $\omega$ equals $2\pi$ times the frequency $f$. The resistive component $R_x$ is thus measured in terms of the fixed resistor $R_B$, the fixed capacitance $C_N$ and the variable capacitor $C_A$, independently of the frequency $f$, and the reactance component $X_x$, which is shown to be inversely proportional to $\omega$ and consequently to the frequency $f$, is measured in terms of the variable capacitor $C_P$.

At radio frequencies, difficulty is encountered obtaining a satisfactory variable resistor. According to the invention illustrated in Fig. 1, however, only fixed resistors $R_A$, $R_B$ and $R_P$ are employed, in combination with variable capacitors $C_A$ and $C_P$. Reliance is placed upon the adjustment of the variable capacitors $C_A$ and $C_P$, which does away with the necessity of employing variable resistors. Since the fixed resistor $R_B$, which is the only resistor appearing in either equation, can be made with much smaller residual parameters than can a variable resistor, and since variable air condensers can also be made to have very small residual parameters, the invention provides for the obtaining of the equivalent of a continuously variable resistor having negligible residual reactance.

The formula for the unknown resistive component $R_x$, furthermore, since it involves the ratio of the variable capacitance $C_A$ to the fixed capacitance $C_N$, demonstrates that a multiplying factor can be obtained that shall yield an incremental resistance range from zero to a value considerably higher than that of the standard resistor $R_B$. The dial (not shown) of the capacitor $C_A$ can thus be calibrated to read incremental resistive ohms directly, independently of the frequency $f$. A small trimmer condenser $C_A'$, connected in parallel with the calibrated condenser $C_A$, as illustrated in Figs. 2 and 3, may be adjusted to enable setting the calibrated condenser $C_A$ to read zero resistance at the time of initial balance of the bridge, when the terminals 14 and 15 are short-circuited by the short-circuiting element 16. By suitable choice of the value of the resistor $R_P$, an initial balance may be established with the main calibrated condenser $C_A$ set at approximately minimum capacitance, and with the trimmer condenser $C_A'$ set at mid-scale.

The dial (not shown) of the capacitor $C_P$ can be calibrated, at any one frequency, to read incremental reactive ohms directly. If this calibration is made at a frequency of 1 megacycle, the reading must be divided by the operating frequency in megacycles when measurements are made at an operating frequency other than 1 megacycle.

It is desirable to connect a further trimmer capacitor $C_P'$ in series with the capacitor $C_P$ in the fourth arm, and having substantially the same capacitance range. In the absence of this further capacitor $C_P'$, though it would still be possible to calibrate the dial (not shown) of the capacitor $C_P$ to read reactance directly at any one frequency, it would not be possible to set this dial to zero for the initial balance, with the terminals 14 and 15 short-circuited. Employing the additional capacitor $C_P'$ makes it possible to set the zero of the capacitor $C_P$, upon initial balance, at either of the opposite ends of the reactance-condenser scale. Full-dial coverage is thus made available to enable measurements to be made readily both of inductive and capacitive reactances $X_x$.

One of the difficulties attendant upon the use of bridge meters at high radio frequencies has been to find suitable shielding to eliminate the effects of stray capacitances to ground. These capacitances are particularly troublesome in the said fourth arm of the bridge, containing the resistor $R_P$, the condenser $C_P$ and the unknown impedance $Z_x$. In accordance with a feature of the present invention, this difficulty is wholly overcome by suitable shielding.

Referring first to Fig. 2, an innermost shield 17 for the calibrated capacitor $C_P$, connected at the point 23, localizes the variable stray capacitance of its rotor within this shield, thus protecting the trimmer condenser $C_P'$, external to this shield 17, from the effects of this stray capacitance, and preventing interlocking of the settings of the condenser $C_P$ and $C_P'$. An intermediately disposed shield 18, connected to the vertex 12 at 24, encloses both the shield 17 and the capacitor $C_P'$ to place the stray capacitances of the shield 17 and the condenser $C_P'$ to the shield 18 across the capacitor $C_P'$. An outermost shield 19, enclosing the shield 18, the vertex 12, the secondary winding of the transformer 20 and the connections, throws the capacitance between the shields 18 and 19 from the vertex 12 to the vertex 10. This is because the shield 19 for the ungrounded secondary winding of the transformer 20 is connected to the vertex 10 of the bridge. No harm can be introduced by this capacitance from the vertex 12 to the vertex 10 since it falls across the secondary winding of the transformer 20. In this manner, the capacitance from the shield 19 to the ground 7 falls across the capacitor $C_N$.

Though this shielding arrangement solves one problem, it introduces another. The capacitance of the innermost shield 17 to the middle shield 18 is in this manner thrown across the trimmer condenser $C_P'$. As the minimum capacitance of this trimmer condenser $C_P'$ is therefore raised above that of the calibrated condenser $C_P$, its reactance range is thereby reduced with respect to that covered by the calibrated condenser $C_P$. This would make it impossible to obtain an initial balance with the trimmer condenser $C_P'$ for all points on the reactance-condenser scale, which would destroy the very purpose, described above, of introducing the trimmer condenser $C_P'$.

This difficulty may be overcome, as illustrated in Fig. 3, by providing two different ratio-arm resistors $R_A$ in the second arm: one, for use in measuring inductive reactances, marked $R_A(L)$, and the other, for use in measuring capacitive reactances, marked $R_A(C)$. The two resistors $R_A(L)$ and $R_A(C)$ thus correspond to the single resistor $R_A$ of Figs. 1 and 2. The resistor $R_A(L)$ is connected to the vertex 13 through a trimmer condenser $C_N'$ and the resistor $R_A(C)$ through a trimmer condenser $C_N''$. The condenser $C_N$ is diagrammatically indicated in this Fig. 3 as representing the stray capacitance to ground of the shield 19, associated with the reactance-balance assembly and the transformer 20. Though the major part of the capacitance $C_N$, in Fig. 3, is the capacitance from the outer shield 19 of the reactance-condenser assembly to the ground 7, a small part occurs between the two shields of the transformer 20. The transformer shield should be suitably designed, as disclosed in my said paper.

The trimmer condensers $C_N'$ and $C_N''$ are used for two purposes: first, to equalize the capacitance to ground from the vertex 10 of the bridge when the two ratio-arm resistors $R_A(L)$ and $R_A(C)$ are respectively connected to the vertex 10 by a switch 21; and, secondly, to adjust for slight variations in circuit parameters, between instruments.

As explained in my said article, the resistors $R_A(L)$ and $R_A(C)$ enter into the initial reactance balance of the bridge, but do not affect the resistance balance. Proper choice of the resistance, therefore, permits setting the calibrated reactance condenser $C_P$ initially at maximum capacitance, with the trimmer condenser $C_P'$ at minimum capacitance, or vice versa. When the trimmer condenser $C_P'$ is varied, initial balance of the reactance condenser may therefore be obtained at settings in the neighborhood of either maximum or minimum, with only a small region in mid-scale not covered.

Stray capacitances from the vertex 11 to the ground 7, as they fall across the detector 9, introduce no complications. Capacitances from the vertex 10 to the ground 7 may be equalized in the two positions of the switch 21 by adjustment of the respective trimmer condensers $C_N'$ and $C_N''$. Various other possible sources of error may be eliminated as described in my said paper. One expedient there described, for example, is to enclose the resistor $R_P$ in a metal shield (not shown) and connected so as to minimize the capacitance to the ground 7 of the lead from the resistor $R_P$ to the reactance condenser $C_P$.

In accordance with the present invention, it is possible to obtain a direct-reading range of at least from zero to 1000 ohms resistance and of at least from zero to 5000 ohms reactance at a frequency of one megacycle. The limitations imposed upon the bridge with respect to frequency range arise from residual parameters in the circuit elements and in the wiring.

Though the invention has thus far been illustrated in Figs. 1 to 3 as adapted for series-substitution measurements, it is equally adapted for parallel-substitution methods, as will now be explained in connection with Fig. 4. The unknown impedance $Z_x$ is there shown adapted to be connected to terminals 23 and 24, in parallel with the condenser $C_A$ and the resistor $R_A$. Letting $Y_x$ represent the reciprocal of this unknown impedance $Z_x$, which is known as the admittance, and assuming that it has a conductive component $G_x$ and a susceptive component $B_x$, connected in parallel, $$Y_x = \frac{1}{Z_x} = G_x + jB_x$$

where $$G_x = \frac{R_x}{R_x^2 + X_x^2}$$

and $$B_x = -\frac{X_x}{R_x^2 + X_x^2}$$

Initial balance is first effected by adjusting the condensers $C_A$ and $C_P$ with the terminals 23 and 24 open-circuited. Let the readings of the capacitors $C_A$ and $C_P$ corresponding to this initial balance be represented by $C_{A_1}$ and $C_{A_2}$, respectively. The unknown impedance is then connected to the terminals 23 and 24, and balance is restored. Let the new readings of the condensers $C_A$ and $C_P$ be represented by $C_{A_1}$ and $C_{P_2}$. It may be shown that $$B_x = \omega(C_{A_1} - C_{A_2}) \qquad (3)$$

$$G_x = \frac{C_N}{R_B}\left(\frac{1}{C_{P_2}} - \frac{1}{C_{P_1}}\right) \qquad (4)$$

The measurement of the susceptance component $B_x$ may thus be effected merely by calibrating the condenser $C_A$ in terms of susceptance, and that of the conductance component $G_x$ by calibrating the condenser $C_P$ in terms of conductance. The component $G_x$, it will be noted, is proportional, not to $C_P$, but to $$\frac{1}{C_P}$$

As in the circuit of Figs. 1 to 3, one of these measurements is effected by adjustment of one of the arms of the bridge, and the other by adjustment of the opposite arm of the bridge, and each by means of a single variable condenser. As before, the condenser $C_N$ and the resistor $R_B$ may be fixed.

For the sake of uniformity, the susceptive component $B_x$ will be referred to in the claims as a reactive component, and the conductance component $G_x$ as a resistive component; susceptance is the inverse of parallel reactance and conductance is the inverse of parallel resistance.

The invention has thus far been described in Figs. 1 to 4 in connection with a non-inductive bridge. As illustrated in Fig. 5, the bridge may be non-capacitive instead of non-inductive; that is, it may contain either capacitors or inductors, but not both. The fixed capacitor $C_N$ of Fig. 1 is replaced by a substantially pure fixed inductor $L_N$, and the variable capacitors $C_A$ and $C_P$ of Fig. 1 by variable inductors $L_A$ and $L_P$, respectively. The balance adjustments may be the same as described in connection with Figs. 1 to 3, the corresponding equations yielding:

$$R_x = R_B L_N\left(\frac{1}{L_{A_2}} - \frac{1}{L_{A_1}}\right) \qquad (5)$$

$$X_x = \omega(L_{P_1} - L_{P_2}) \qquad (6)$$

The measurements are again seen to depend upon adjustments of single elements in opposite arms of the bridge; the inductive element $L_A$ in the before-mentioned third arm of the bridge, and the inductive element $L_P$ in the said fourth arm. The advantages before described of having fixed resistors, and particularly the fixed resistor $R_B$, are obtained.

With the non-capacitive bridge of Fig. 5, as with the non-inductive bridge of Figs. 1 to 4, it is possible to make either series-substitution measurements, as in Figs. 1, 2, 3 and 5, or parallel-substitution measurements, as in Fig. 4. This appears from the connections of Fig. 6, which correspond exactly to the connections of Fig. 4, except that the non-capacitive bridge of Fig. 5 is employed. Employing the same symbols as before, the susceptance component $B_x$ and the conductance component $G_x$ of the unknown admittance $Y_x$ may be obtained from measurements with the bridge of Fig. 6 through the medium of the relations:

$$B_x = \frac{1}{\omega}\left(\frac{1}{L_{A_2}} - \frac{1}{L_{A_1}}\right) \tag{7}$$

$$G_x = \frac{1}{R_B L_N}(L_{P_2} - L_{P_1}) \tag{8}$$

As may be seen from Equations 1, 4, 5 and 8, it is not absolutely essential that the capacitance $C_N$ and the resistance $R_B$ of Figs. 1 to 4 and that the inductance $L_N$ and the resistance $R_B$ of Figs. 5 and 6 be constant, independent of frequency, provided that the product or the quotient, as the case may be, of their effective values is constant as a function of frequency. It is also not essential that they be completely pure. Letting the dissipation factor, $$D = \frac{R}{X} = \frac{G}{B}$$

and the storage factor, $$Q = \frac{X}{R} = \frac{B}{G}$$

then the equations so far developed will hold, provided the dissipation factor, D, of the one equals the storage factor, Q, of the other.

Figures 7, 8, 9:
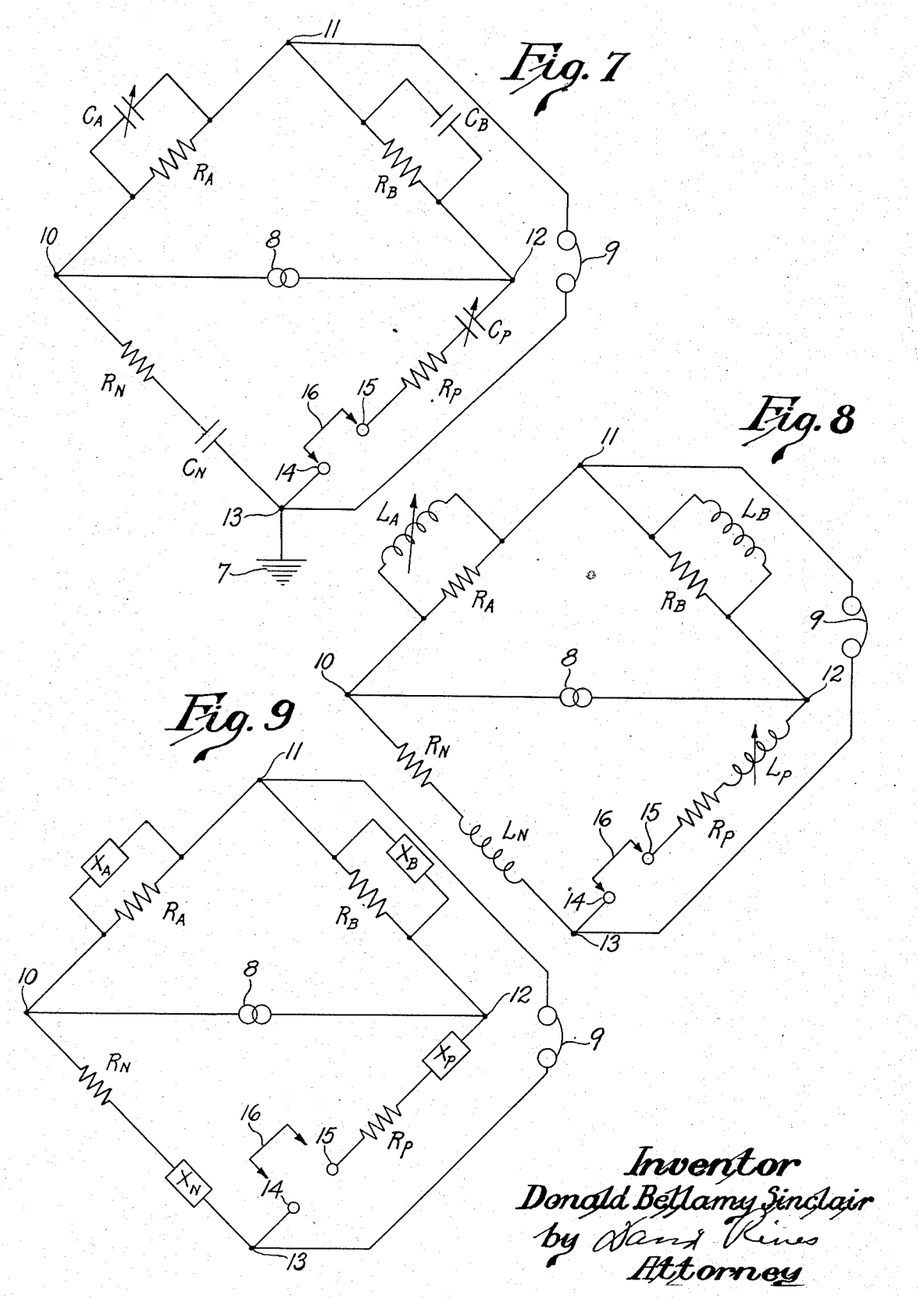
Fig. 7 is a view similar to Fig. 1 according to which additional elements may be employed in the bridge.
Fig. 8 is a view similar to Fig. 5, but embodying the modification of Fig. 7.
Fig. 9 is a view similar to Fig. 1 illustrating a generalized circuit arranged and constructed in accordance with the present invention.

This may be understood, for example, from the circuit arrangement of Fig. 7, in which a resistor $R_N$ is shown connected in series with the capacitor $C_N$, and a capacitor $C_B$ is connected in parallel with the resistor $R_B$. The impedance of the second arm of the bridge is now, not $R_B$ alone, as in the bridges of Figs. 1 to 6, but $$\frac{1}{\frac{1}{R_B} + j\omega C_B} = \frac{R_B}{1 + j\omega C_B R_B}$$

The impedance of the first arm is no longer, $$\frac{1}{\omega C_N}$$

but $$R_N = \frac{1}{j\omega C_N} = \frac{1 + j\omega C_N R_N}{j\omega C_N}$$

The ratio of these impedances is $$\frac{R_B}{j\omega C_N} \cdot \frac{1 + j\omega C_N R_N}{1 + j\omega C_B R_B}$$

If, now, $$R_N C_N = R_B C_B \tag{9}$$

this ratio becomes $$\frac{R_B}{j\omega C_N}$$

and Formula 1 becomes reproduced in the circuit of Fig. 7, the same as in the circuits of Figs. 1 to 4. Equation 9 may be written as follows:

$$R_N C_N = \frac{R_N \omega C_N}{\omega} = \frac{R_N}{X_N} \cdot \frac{1}{\omega} = \frac{D_N}{\omega} = R_B C_B = \frac{R_B \omega C_B}{\omega} = \frac{B_B}{G_B} \cdot \frac{1}{\omega} = \frac{Q_B}{\omega}$$

therefore, $$D_N = Q_B.$$

The circuit of Fig. 7, therefore, is within the present invention, equally with the circuits of Figs. 1 to 4, provided Equation 9 is satisfied; and the circuits of Figs. 5 and 6 are similarly within the present invention, as illustrated in Fig. 8, assuming that a resistor $R_N$ is connected in series with the inductor $L_N$, and an inductor $L_B$ is connected in parallel with the resistor $R_B$, provided that $$\frac{R_N}{L_N} = \frac{R_B}{L_B} \tag{10}$$

In all cases, in order to make the resistance and reactance, or conductance and susceptance, adjustments independent of each other, the product of the impedances in one of the pairs of the opposite arms must be substantially a pure imaginary. Thus, $$\frac{R_B}{j\omega C_N}$$

or $R_B j\omega L_N$ is a pure imaginary.

Figure 10:
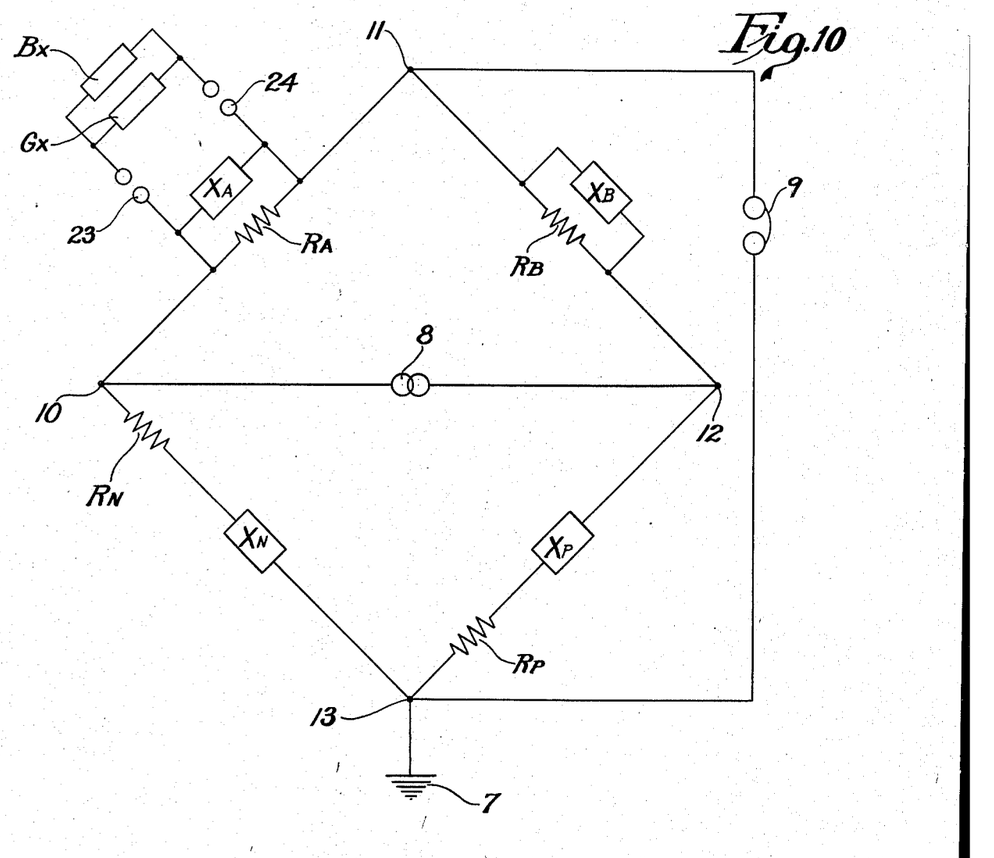
Fig. 10 is a view similar to Fig. 9, but with the unknown impedance connected in a different arm of the bridge.

The circuits of Figs. 7 and 8 are both within the generalized circuit of Figs. 9 and 10, where $X_N$ represents either $\omega L_N$ (Figs. 5 and 6) or $$-\frac{1}{\omega C_N}$$

(Figs. 1 to 4 and 7), $X_B$ represents either $\omega L_B$ (Fig. 8) or $$-\frac{1}{\omega C_B}$$

(Fig. 7), $X_A$ represents either $\omega L_A$ (Figs. 5 and 6) or $$-\frac{1}{\omega C_A}$$

(Figs. 1 to 4 and 7) and $X_P$ represents either $\omega L_P$ (Figs. 5 and 6) or $$-\frac{1}{\omega C_P}$$

(Figs. 1 to 4 and 7). The reactances of the bridge are all of the same kind, either capacitive or inductive.

Fig. 9, like Figs. 1 to 3, 5, 7 and 8, illustrates the use of the bridge according to the series-substitution method. Fig. 10, like Figs. 4 and 6, illustrates the use of the bridge according to the parallel-substitution method.

The equation generalizing Equations 9 and 10 becomes $$D_N = \frac{R_N}{X_N} = \frac{R_B}{X_B} = \frac{B_B}{G_B} = Q_B \tag{11}$$

and the generalized equations for $X_x$ and $R_x$ become $$R_x = R_B X_N \left(\frac{1}{X_{A_2}} - \frac{1}{X_{A_1}}\right) \tag{12}$$

$$X_x = X_{P_1} - X_{P_2} \tag{13}$$

and for $B_x$ and $G_x$, $$B_x = \frac{1}{X_{A_2}} - \frac{1}{X_{A_1}} \tag{14}$$

$$G_x = \frac{1}{R_B X_N}(X_{P_2} - X_{P_1}) \tag{15}$$

In the claims, it will be understood that the term "reactance" will be used as applying to the net reactance of combinations of inductance and capacitance, as well as to individual inductance or capacitance. When "reactance of one kind only" is referred to, it will be understood to apply to net reactance, either inductive or capacitive, as the case may be.

For high frequencies, shielding arrangements such as are illustrated in Figs. 2 and 3, may be embodied also in the bridges of the other figures.

Further modifications will occur to persons skilled in the art, and all such are considered to fall within the spirit and scope of the invention, as defined in the appended claims.

What is claimed is:

1. A null-type circuit for measuring an impedance having, in combination, a substantially non-inductive Wheatstone bridge provided with a substantially non-capacitive arm having a resistance, a substantially non-resistive arm having a capacitance, a third arm having a fixed resistance and a variable capacitance in parallel, and a fourth arm having a fixed resistance and a variable capacitance in series, means for connecting the impedance in parallel with the parallel-connected resistance and capacitance in the third arm, and means for adjusting the variable capacitances to balance the bridge.

2. A null-type circuit for measuring an impedance having, in combination, a substantially non-inductive Wheatstone bridge provided with a substantially non-capacitive arm having a resistance, a substantially non-resistive arm having a capacitance, a third arm having a fixed resistance and a variable capacitance in parallel, and a fourth arm having a fixed resistance and a variable capacitance in series, means for connecting the impedance in series with the series-connected resistance and capacitance in the fourth arm, and means for adjusting the variable capacitances to balance the bridge.

3. A null-type circuit for measuring an impedance having, in combination, a substantially non-inductive Wheatstone bridge provided with a substantially non-capacitive arm having a fixed resistance, a substantially non-resistive arm having a fixed capacitance, a third arm having a fixed resistance and a variable capacitance in parallel, and a fourth arm having a fixed resistance and a variable capacitance in series, means for connecting the impedance in parallel with the parallel-connected resistance and capacitance in the third arm or in series with the series-connected resistance and capacitance in the fourth arm, and means for varying the capacitances in the third and fourth arms.

4. A null-type circuit for measuring an impedance having, in combination, a substantially non-capacitive Wheatstone bridge provided with a substantially non-inductive arm having a resistance, a substantially non-resistive arm having an inductance, a third arm having a fixed resistance and a variable inductance in parallel, and a fourth arm having a fixed resistance and a variable inductance in series, means for connecting the impedance in parallel with the parallel-connected resistance and inductance in the third arm or in series with the series-connected resistance and inductance in the fourth arm, and means for varying the inductances in the third and fourth arms.

5. A null-type circuit for measuring an impedance having, in combination, a substantially non-capacitive Wheatstone bridge provided with a substantially non-inductive arm having a resistance, a substantially non-resistive arm having an inductance, a third arm having a fixed resistance and a variable inductance in parallel, and a fourth arm having a fixed resistance and a variable inductance in series, means for connecting the impedance in parallel with the parallel-connected resistance and inductance in the third arm, and means for adjusting the variable inductances to balance the bridge.

6. A null-type circuit for measuring an impedance having, in combination, a substantially non-capacitive Wheatstone bridge provided with a substantially non-inductive arm having a resistance, a substantially non-resistive arm having an inductance, a third arm having a fixed resistance and a variable inductance in parallel, and a fourth arm having a fixed resistance and a variable inductance in series, means for connecting the impedance in series with the series-connected resistance and inductance in the fourth arm, and means for adjusting the variable inductances to balance the bridge.

7. A null-type circuit for measuring an impedance having, in combination, a substantially non-capacitive Wheatstone bridge provided with a substantially non-inductive arm having a fixed resistance, a substantially non-resistive arm having a fixed inductance, a third arm having a fixed resistance and a variable inductance in parallel, and a fourth arm having a fixed resistance and a variable inductance in series, means for connecting the impedance in parallel with the parallel-connected resistance and inductance in the third arm or in series with the series-connected resistance and inductance in the fourth arm, and means for varying the inductances in the third and fourth arms.

8. A null-type circuit for measuring an impedance having, in combination, a substantially non-inductive Wheatstone bridge provided with a substantially non-capacitive arm having a resistance, a substantially non-resistive arm having a capacitance, a third arm having a resistance and a capacitance in parallel, and a fourth arm having a resistance and a capacitance in series, means for connecting the impedance in the fourth arm, means for varying the capacitances in the third and fourth arms, and a trimmer capacitance in parallel with the capacitance in the third arm.

9. A null-type circuit for measuring an impedance having, in combination, a substantially non-inductive Wheatstone bridge provided with a substantially non-capacitive arm having a resistance, a substantially non-resistive arm having a capacitance, a third arm having a resistance and a capacitance in parallel, a fourth arm having a resistance and a capacitance in series, means for connecting the impedance in the fourth arm, means for varying the capacitances in the third and fourth arms, and a further capacitance in series with the capacitance in the fourth arm and having substantially the same capacitance range.

10. A null-type circuit for measuring an impedance having, in combination, a substantially non-inductive Wheatstone bridge provided with a substantially non-capacitive arm having a resistance, a substantially non-resistive arm having a capacitance, a third arm having a resistance and a capacitance in parallel, and a fourth arm having a resistance and a capacitance in series, means for connecting the impedance in the fourth arm, means for varying the capacitances in the third and fourth arms, a further capacitance in series with the capacitance in the fourth arm and having substantially the same capacitance range, and means for shielding the capacitances in the fourth arm from each other.

11. A null-type circuit for measuring an impedance having, in combination, a substantially non-inductive Wheatstone bridge provided with a substantially non-capacitive arm having a fixed resistance, a substantially non-resistive arm opposite thereto having a capacitance, a third arm having a resistance and a capacitance in parallel, a fourth arm having a resistance and a capacitance in series, means for connecting the impedance in the fourth arm, a source of energy connecting the vertex between the first-named arm and the fourth arm and the vertex between the second-named arm and the third arm, means for varying the capacitances in the third and fourth arms, and a shield enclosing the capacitance in the fourth arm and the source of energy.

12. A null-type circuit for measuring an impedance having, in combination, a substantially non-inductive Wheatstone bridge provided with a substantially non-capacitive arm having a fixed resistance, a substantially non-resistive arm opposite thereto having a capacitance, a third arm having a resistance and a capacitance in parallel, a fourth arm having a resistance and a capacitance in series, means for connecting the impedance in the fourth arm, a source of energy connecting the vertex between the first-named arm and the fourth arm and the vertex between the second-named arm and the third arm, means for varying the capacitances in the third and fourth arms, a trimmer capacitance in series with the capacitance in the fourth arm and having substantially the same capacitance range, a shield enclosing the first-named capacitance in the fourth arm, a shield enclosing the first-named shield and the trimmer capacitance, and a shield enclosing the second-named shield, the first-named vertex and the source of energy.

13. A null-type circuit for measuring an impedance having, in combination, a substantially non-inductive Wheatstone bridge provided with a substantially non-capacitive arm having a resistance, a substantially non-resistive arm having a capacitance and a trimmer capacitance, a third arm having a resistance and a capacitance in parallel, a fourth arm having a resistance and a capacitance in series, means for connecting the impedance in the fourth arm, and means for varying the capacitances in the third and fourth arms.

14. A null-type circuit for measuring an impedance having, in combination, a substantially non-inductive Wheatstone bridge provided with a substantially non-capacitive arm having a resistance, a substantially non-resistive arm having a capacitance, a third arm, a fourth arm having a resistance and a capacitance in series, means for connecting the impedance in the fourth arm, two resistances each having one end connected to the vertex between the first-named arm and the third arm, a trimmer capacitance connecting the other end of one of the said two resistances to the vertex between the second-named arm and the fourth arm, a trimmer capacitance connecting the other end of the other of the said two resistances to the said vertex between the second-named arm and the fourth arm, means for selectively connecting the said other ends of the resistances to the vertex between the second-named arm and the third arm, the third arm having a capacitance connected between the said one end of the resistances and the said vertex between the second-named arm and the third arm, and means for varying the capacitances in the third and fourth arms.

15. A null-type circuit for measuring an impedance having, in combination, a substantially non-inductive Wheatstone bridge provided with a substantially non-capacitive arm having a fixed resistance, a substantially non-resistive arm opposite thereto, a third arm, a fourth arm having a resistance and a capacitance in series, means for connecting the impedance in the fourth arm, a source of energy connecting the vertex between the first-named arm and the fourth arm and the vertex between the second-named arm and the third arm, a shield enclosing the capacitance in the fourth arm, the first-named vertex and the source of energy, the vertex between the second-named arm and the fourth arm being grounded, whereby the shield is capacitively connected to the ground, two resistances each having one end connected to the vertex between the first-named arm and the third arm, a trimmer capacitance connecting the other end of one of the said two resistances to the vertex between the second-named arm and the fourth arm, a trimmer capacitance connecting the other end of the other of the said two resistances to the said vertex between the second-named arm and the fourth arm, means for selectively connecting the said other ends of the resistances to the vertex between the second-named arm and the third arm, the third arm having a capacitance connected between the said one end of the resistances and the said vertex between the second-named arm and the third arm, and means for varying the capacitances in the third and fourth arms.

16. A null-type circuit for measuring an impedance having, in combination, a substantially non-inductive Wheatstone bridge provided with a substantially non-capacitive arm having a resistance, a substantially non-resistive arm, a third arm, a fourth arm having a resistance and a capacitance in series, means for connecting the impedance in the fourth arm, two resistances each having one end connected to the vertex between the first-named arm and the third arm, a capacitance connecting the other end of one of the said two resistances to the vertex between the second-named arm and the fourth arm, a capacitance connecting the other end of the other of the said two resistances to the said vertex between the second-named arm and the fourth arm, means for selectively connecting the said other ends of the resistances to the vertex between the second-named arm and the third arm, the third arm having a capacitance connected between the said one end of each of the resistances and the said vertex between the second-named arm and the third arm, and means for varying one of the capacitances in the third and fourth arms.

17. A null-type circuit for measuring an impedance having, in combination, a substantially non-inductive Wheatstone bridge provided with oppositely disposed arms one of which has a variable capacitance in parallel with a resistance and the other of which has a variable capacitance in series with a resistance, each of the impedances of the remaining two arms comprising separate resistance and capacitance, but their product being substantially a pure imaginary, means for connecting the impedance in parallel with the parallel-connected capacitance and resistance in the first-named arm or in series with the series-connected capacitance and resistance in the second-named arm, and means for adjusting the variable capacitances to balance the bridge.

18. A null-type circuit for measuring an impedance having, in combination, a substantially non-inductive Wheatstone bridge provided with two oppositely disposed arms each having separate resistance and capacitance, but their product being substantially a pure imaginary, a third arm having a resistance and a variable capacitance in parallel, and a fourth arm having a resistance and a variable capacitance in series, means for connecting the impedance in series with the series-connected resistance and capacitance in the fourth arm, and means for adjusting the variable capacitances to balance the bridge.

19. A null-type circuit for measuring an impedance having, in combination, a substantially non-capacitive Wheatstone bridge provided with two oppositely disposed arms each having separate resistance and inductance, but their product being substantially a pure imaginary, a third arm having a resistance and a variable inductance in parallel, and a fourth arm having a resistance and a variable inductance in series, means for connecting the impedance in series with the series-connected resistance and inductance in the fourth arm, and means for adjusting the variable inductances to balance the bridge.

20. A null-type circuit for measuring an impedance having, in combination, a substantially non-capacitive Wheatstone bridge provided with two oppositely disposed arms each having a fixed resistance and an inductance, but their product being substantially a pure imaginary, a third arm having a fixed resistance and a variable inductance in parallel, and a fourth arm having a fixed resistance and a variable inductance in series, means for connecting the impedance in series with the series-connected resistance and inductance in the fourth arm, and means for adjusting the variable inductances to balance the bridge.

21. A null-type circuit for measuring an impedance having, in combination, a substantially non-inductive Wheatstone bridge provided with oppositely disposed arms one of which has a capacitance in parallel with a fixed resistance and the other of which has a capacitance in series with a fixed resistance, the product of the impedances of the remaining two arms being substantially a pure imaginary, means for connecting the impedance in parallel with the parallel-connected capacitance and resistance in the first-named arm or in series with the series-connected capacitance and resistance in the second-named arm, and means for balancing the bridge comprising means for adjusting the capacitance in the arm in which the unknown impedance is connected to balance the reactive component of the impedance and means for adjusting the capacitance in the opposite arm to balance the resistive component of the impedance.

22. A null-type circuit for measuring an impedance having, in combination, a substantially non-capacitive Wheatstone bridge provided with oppositely disposed arms one of which has an inductance in parallel with a fixed resistance and the other of which has an inductance in series with a fixed resistance, the product of the impedances of the remaining two arms being substantially a pure imaginary, means for connecting the impedance in parallel with the parallel-connected inductance and resistance in the first-named arm or in series with the series-connected inductance and resistance in the second-named arm, and means for balancing the bridge comprising means for adjusting the inductance in the arm in which the unknown impedance is connected to balance the reactive component of the impedance and means for adjusting the inductance in the opposite arm to balance the resistive component of the impedance.

23. A null-type circuit for measuring an impedance having, in combination, a substantially non-capacitive Wheatstone bridge provided with a pair of oppositely disposed arms one of which is an arm having a resistance and an inductance in parallel and the other of which is an arm having an inductance and a resistance in series, the product of the impedances of the said two arms being substantially a pure imaginary, the Wheatstone bridge being provided also with a third arm having a fixed resistance and a variable inductance in parallel and a fourth arm having a fixed resistance and a variable inductance in series, means for connecting the impedance in the third or fourth arm, and means for adjusting the inductances in the third and fourth arms.

24. A method of measuring an impedance comprising balancing a Wheatstone bridge provided with a pair of oppositely disposed arms one of which has a reactance in parallel with a fixed resistance and the other of which has a reactance of the same kind in series with a fixed resistance and provided with a second pair of oppositely disposed arms one of which has a reactance of the same kind and the other of which has a resistance, the product of the impedances of the second pair of arms being substantially a pure imaginary, connecting the impedance in parallel with the parallel-connected reactance and resistance in the first-named arm or in series with the series-connected reactance and resistance in the second-named arm, and rebalancing the bridge by adjusting the reactance of the arm in which the impedance is connected to balance the reactive component of the impedance and the reactance in the oppositely disposed arm to balance the resistive component of the impedance.

25. A null-type circuit for measuring an impedance having, in combination, a Wheatstone bridge provided with a pair of oppositely disposed arms one of which has a reactance in parallel with a fixed resistance and the other of which has a reactance of the same kind in series with a fixed resistance and provided with a second pair of oppositely disposed arms one of which has a reactance of the same kind and the other of which has a resistance, the product of the impedances of the second pair of arms being substantially a pure imaginary, means for connecting the impedance in parallel with the parallel-connected reactance and resistance in the first-named arm or in series with the series-connected reactance and resistance in the second-named arm, and means for balancing the bridge comprising means for adjusting the reactance of the arm in which the impedance is connected to balance the reactive component of the impedance and means for adjusting the reactance in the oppositely disposed arm to balance the resistive component of the impedance.

26. A null-type circuit for measuring an impedance having, in combination, a Wheatstone bridge provided with a pair of oppositely disposed arms one of which has a reactance in parallel with a fixed resistance and the other of which has a reactance of the same kind in series with a fixed resistance and provided with a second pair of oppositely disposed arms one of which has a fixed reactance of the same kind and the other of which has a fixed resistance, the product of the impedances of the second pair of arms being substantially a pure imaginary, means for connecting the impedance in parallel with the parallel-connected reactance and resistance in the first-named arm or in series with the series-connected reactance and resistance in the second-named arm, and means for balancing the bridge comprising means for adjusting the reactance of the arm in which the impedance is connected to balance the reactive component of the impedance and means for adjusting the reactance in the oppositely disposed arm to balance the resistive component of the impedance.

27. A null-type circuit for measuring an impedance having, in combination, a Wheatstone bridge having reactance of one kind only and resistance and provided with a pair of oppositely disposed arms one arm of which has a reactance in parallel with a resistance and the other of which has a reactance in series with a resistance and having a second pair of oppositely disposed arms one arm of which has a reactance in parallel with a resistance and the other of which has a reactance in series with a resistance, the product of the impedances of the arms of one of the pair of arms being substantially a pure imaginary, means for connecting the impedance in one of the other two arms, and means for varying the reactances in the said other two arms.

28. A null-type circuit for measuring an impedance having, in combination, a Wheatstone bridge having reactance of one kind only and resistance and provided with oppositely disposed arms one of which has a variable reactance in parallel with a fixed resistance and the other of which has a variable reactance in series with a fixed resistance, the impedances of each of the remaining two arms comprising separate resistance and reactance, but their product being substantially a pure imaginary, means for connecting the impedance in parallel with the parallel-connected reactance and resistance in the first-named arm or in series with the series-connected reactance and resistance in the second-named arm, and means for adjusting the variable reactances to balance the bridge.

29. A null-type circuit for measuring an impedance having, in combination, a Wheatstone bridge having reactance of one kind only and resistance and provided with oppositely disposed arms one of which has a variable reactance in parallel with a fixed resistance and the other of which has a variable reactance in series with a fixed resistance, the product of the impedances of the remaining two arms being substantially a pure imaginary, means for connecting the impedance in parallel with the parallel-connected reactance and resistance in the first-named arm or in series with the series-connected reactance and resistance in the second-named arm, and means for balancing the bridge comprising means for adjusting the reactance in the arm in which the unknown impedance is connected to balance the reactive component of the impedance and means for adjusting the reactance in the opposite arm to balance the resistive component of the impedance.

30. A null-type circuit for measuring an impedance having, in combination, a Wheatstone bridge having reactance of one kind only and resistance and provided with oppositely disposed arms one of which has a variable reactance in parallel with a fixed resistance and the other of which has a variable reactance in series with a fixed resistance, the product of the impedances of the remaining two arms being substantially a pure imaginary, means for connecting the impedance in parallel with the parallel-connected reactance and resistance in the said one arm, and means for balancing the bridge comprising means for adjusting the reactance in the arm in which the unknown impedance is connected to balance the reactive component of the impedance and means for adjusting the reactance in the opposite arm to balance the resistive component of the impedance.

31. A null-type circuit for measuring an impedance having, in combination, a Wheatstone bridge having reactance of one kind only and resistance and provided with oppositely disposed arms one of which has a variable reactance in parallel with a fixed resistance and the other of which has a variable reactance in series with a fixed resistance, the product of the impedances of the remaining two arms being substantially a pure imaginary, means for connecting the impedance in series with the series-connected reactance and resistance in the said other arm, and means for balancing the bridge comprising means for adjusting the reactance in the arm in which the unknown impedance is connected to balance the reactive component of the impedance and means for adjusting the reactance in the opposite arm to balance the resistive component of the impedance.

32. A null-type circuit for measuring an impedance having, in combination, a substantially non-inductive Wheatstone bridge provided with a pair of oppositely disposed arms one of which is an arm having a resistance and a capacitance in parallel and the other of which is an arm having a capacitance and a resistance in series and having a second pair of oppositely disposed arms one of which is a third arm having a fixed resistance and a variable capacitance in parallel and the other of which is a fourth arm having a fixed resistance and a variable capacitance in series, the product of the impedances of the first-named and second-named arms being substantially a pure imaginary, means for connecting the impedance in the third or fourth arm, and means for adjusting the capacitances in the third and fourth arms.

DONALD B. SINCLAIR.